(12) United States Patent
Eshima et al.

(10) Patent No.: US 9,431,804 B2
(45) Date of Patent: Aug. 30, 2016

(54) CABLE CLAMP AND HARNESS

(71) Applicant: Hitachi Metals, Ltd., Tokyo (JP)

(72) Inventors: Hirotaka Eshima, Hitachi (JP); Fumihito Oka, Hitachi (JP); Nobuyuki Yamashita, Hitachi (JP); Takahiro Futatsumori, Mito (JP)

(73) Assignee: HITACHI METALS, LTD., Tokyo (JP)

( * ) Notice: Subject to any disclaimer, the term of this patent is extended or adjusted under 35 U.S.C. 154(b) by 65 days.

(21) Appl. No.: 14/493,763

(22) Filed: Sep. 23, 2014

(65) Prior Publication Data

US 2015/0090489 A1    Apr. 2, 2015

(30) Foreign Application Priority Data

Sep. 30, 2013   (JP) .................. 2013-203725

(51) Int. Cl.
| | |
|---|---|
| *H01R 4/28* | (2006.01) |
| *H01B 7/00* | (2006.01) |
| *H02G 3/04* | (2006.01) |
| *H02G 3/06* | (2006.01) |
| *H02G 3/22* | (2006.01) |

(52) U.S. Cl.
CPC .......... *H02G 3/0481* (2013.01); *H02G 3/0616* (2013.01); *H02G 3/22* (2013.01)

(58) Field of Classification Search
CPC .... H01R 4/28; H01B 7/0045; H02G 3/0616; H02G 3/0481
USPC ................. 174/72 A, 481; 493/345
See application file for complete search history.

(56) References Cited

U.S. PATENT DOCUMENTS

| | | | | |
|---|---|---|---|---|
| 5,865,654 | A * | 2/1999 | Shimirak | H01R 13/11 439/578 |
| 7,070,440 | B1 * | 7/2006 | Zerebilov | H01R 9/053 439/394 |
| 2012/0196464 | A1 * | 8/2012 | Lu | H01R 13/5202 439/277 |
| 2013/0130541 | A1 * | 5/2013 | Wei | H01R 13/405 439/578 |

FOREIGN PATENT DOCUMENTS

| | | | | |
|---|---|---|---|---|
| FR | 2632782 A1 H | * | 12/1989 | ............. H01R 24/40 |
| FR | 2632782 A1 I | * | 12/1989 | ............. H01R 24/40 |
| IN | 190866 B H | * | 8/2003 | ............. H01R 24/02 |
| JP | 08055654 A H | * | 2/1996 | ............. H01R 24/02 |
| JP | 08055654 A I | * | 2/1996 | ............. H01R 24/02 |
| JP | 2007-299819 A | | 11/2007 | |

\* cited by examiner

*Primary Examiner* — Timothy Thompson
*Assistant Examiner* — Charles Pizzuto
(74) *Attorney, Agent, or Firm* — McGinn IP Law Group, PLLC

(57) ABSTRACT

A cable clamp is configured to fix an electric cable including an electric wire section and an outer layer section covering the electric wire section to a fixed member. The cable clamp includes a first cylindrical portion for the electric wire section to be inserted therein, and a second cylindrical portion formed around outside the first cylindrical portion to surround the first cylindrical portion. The second cylindrical portion includes a receiving portion formed between it and the first cylindrical portion to receive the outer layer section. The second cylindrical portion is swaged with the electric wire section inserted in the first cylindrical portion and with the outer layer section received in the receiving portion, so that the outer layer section is gripped by the first cylindrical portion and the second cylindrical portion.

7 Claims, 7 Drawing Sheets

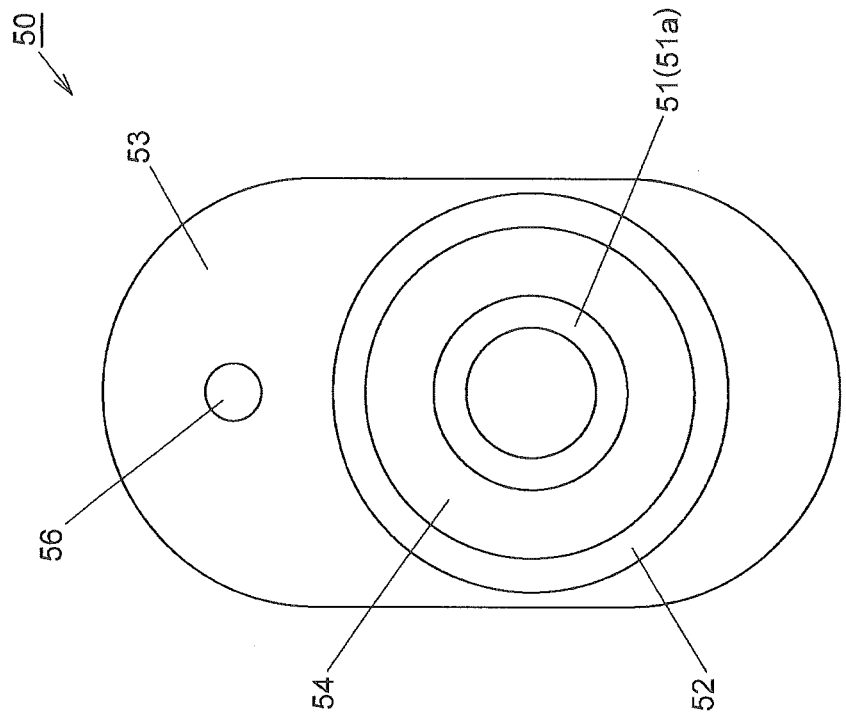
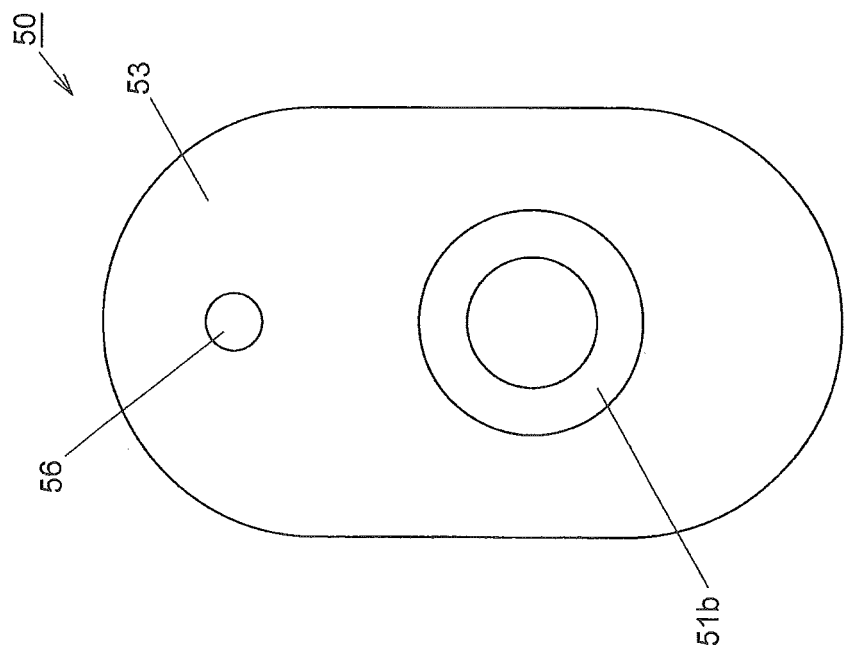

CABLE CLAMP AND HARNESS

The present application is based on Japanese patent application No. 2013-203725 filed on Sep. 30, 2013, the entire contents of which are incorporated herein by reference.

BACKGROUND OF THE INVENTION

1. Field of the Invention

This invention relates to a cable clamp to be used for fixing an electric cable, and a harness using the same.

2. Description of the Related Art

In recent years, due to widespread use of robots, electrical equipment for automobiles, etc., electric cables have been used even in environments where they undergo repeated bendings. It is known that the electric cables of this type have a structure in which an electric wire section is configured by use of one or more electric wires and is protected with a sheath therearound.

Also, a known method to fix the electric cable is to use a cable clamp. Specifically, that known method fixes the electric cable by integrally forming a cylindrical portion on the cable clamp, inserting the electric cable into the cylindrical portion, and swaging the cylindrical portion.

Refer to JP-A-2007-299819, for example.

SUMMARY OF THE INVENTION

Now, when as described above, the electric cable is inserted into the cylindrical portion of the cable clamp and the cylindrical portion is swaged, the larger amount of deformation of the cylindrical portion results from the swaging, the stronger electric cable gripping force (herein also simply referred to as "gripping force" or "cable gripping force") the cylindrical portion has. For this reason, when the electric cable is desired to be fixed with a stronger gripping force for the purpose of, for example, enhancing reliability when used for automobiles, it is necessary to increase a swaging load. The swaging load refers to a load applied to the cylindrical portion when the cylindrical portion is swaged using a swaging tool.

However, increasing the swaging load when swaging the cylindrical portion of the cable clamp leads to an increase in mechanical load acting on the electric wire section of the electric cable. A reason therefor is as follows. In general, electric cables are structured to be externally protected with a sheath (jacket). Also, the sheath is formed of a rubber material. Due to this, when the electric cable is inserted into the cylindrical portion of the cable clamp and the cylindrical portion is swaged, a tightening force resulting from the swaging is transmitted through the sheath to the electric wire section. Therefore, the increasing of the swaging load leads to a corresponding increase in load acting on the electric wire section.

A principal object of the invention is to provide a technique for, when an electric cable is fixed by swaging using a cable clamp, being able to enhance cable gripping force without increasing a load acting on an electric wire section of the electric cable.

(1) According to one embodiment of the invention, a cable clamp, which is configured to fix an electric cable including an electric wire section and an outer layer section covering the electric wire section to a fixed member, comprises:

a first cylindrical portion for the electric wire section to be inserted therein; and a second cylindrical portion formed around outside the first cylindrical portion to surround the first cylindrical portion, the second cylindrical portion including a receiving portion formed between it and the first cylindrical portion to receive the outer layer section, wherein the second cylindrical portion is swaged with the electric wire section inserted in the first cylindrical portion and with the outer layer section received in the receiving portion, so that the outer layer section is gripped by the first cylindrical portion and the second cylindrical portion.

In one embodiment, the following modifications and changes may be made.

(i) The cable clamp further comprises:

an interlocking portion, which interlocks the first cylindrical portion and the second cylindrical portion together, and which is configured to be connected to the fixed member to thereby fix the cable to the fixed member.

(ii) The interlocking portion includes a flange formed to be jutted outward relative to the first cylindrical portion and the second cylindrical portion, the flange being formed with a connecting hole therein for a bolt to connect the interlocking portion to the fixed member.

(iii) The second cylindrical portion includes a deformation relieving portion around a flange side thereof relative to a swaged portion thereof, to relieve deformation of the flange due to the swaging.

(iv) The deformation relieving portion is being formed as a thin portion partially reduced in thickness dimension of the second cylindrical portion.

(2) According to another embodiment of the invention, a harness comprises:

an electric cable including an electric wire section and an outer layer section covering the electric wire section; and a cable clamp to fix the electric cable to a fixed member, the cable clamp comprising a first cylindrical portion for the electric wire section to be inserted therein, and a second cylindrical portion formed around outside the first cylindrical portion to surround the first cylindrical portion, the second cylindrical portion including a receiving portion formed between it and the first cylindrical portion to receive the outer layer section, the electric cable and the cable clamp being combined together by swaging of the second cylindrical portion with the electric wire section inserted in the first cylindrical portion and with the outer layer section received in the receiving portion.

In another embodiment, the following modifications and changes may be made.

The electric cable includes a shield layer, the shield layer being received in the receiving portion, and folded back in the receiving portion to be in contact with both an outer circumferential surface of the first cylindrical portion and an inner circumferential surface of the second cylindrical portion.

(Points of the Invention)

The invention allows for, when the electric cable is fixed by swaging using the cable clamp, being able to enhance cable gripping force without increasing a load acting on the electric wire section of the electric cable.

BRIEF DESCRIPTION OF THE DRAWINGS

The preferred embodiments according to the invention will be explained below referring to the drawings, wherein:

FIG. 5A is a view on arrow A in FIG. 4;

FIG. 5B is a view on arrow B in FIG. 4;

DETAILED DESCRIPTION OF THE PREFERRED EMBODIMENTS

Figure 1:
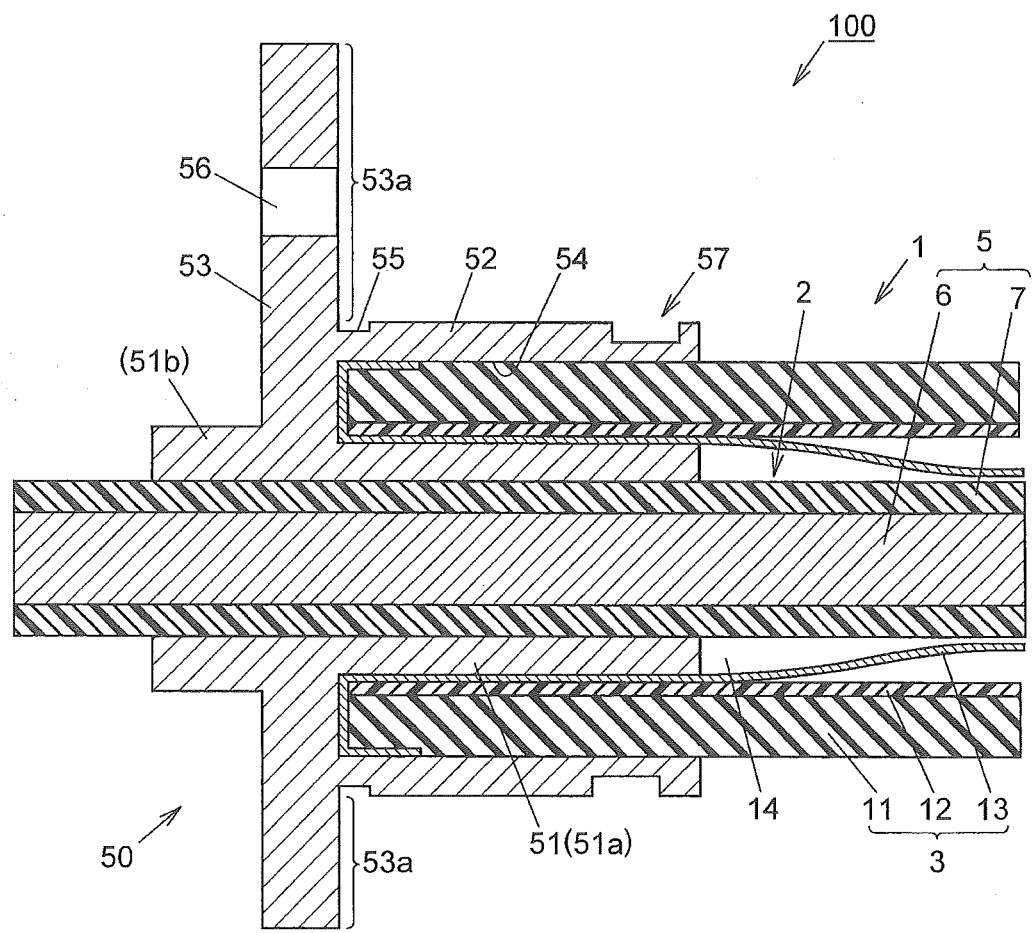
FIG. 1 is a cross sectional view showing a configuration example of an essential portion of a harness in an embodiment according to the invention.

Below is described an embodiment according to the invention in detail, in conjunction with the accompanying drawings. In the embodiment according to the invention, the following descriptions are in turn given:
1. Harness outline
2. Electric cable configuration
3. Technical significance of providing a reinforcing braid layer
4. Relationship between an electric wire section and a protecting section
5. Cable clamp configuration
6. Harness configuration
7. Harness attachment
8. Functions and advantageous effects of the embodiment
9. Modifications <1. Harness Outline>

FIG. 1 is a cross sectional view showing a configuration example of an essential portion of a harness 100 in an embodiment according to the invention. The harness 100 illustrated is configured to include an electric cable 1 and a cable clamp 50. Below are described, in turn, respective configurations of the electric cable 1 and the cable clamp 50, followed by a configuration of the harness 100 with the electric cable 1 and the cable clamp 50 combined together.

<2. Electric Cable Configuration>

Figure 2:
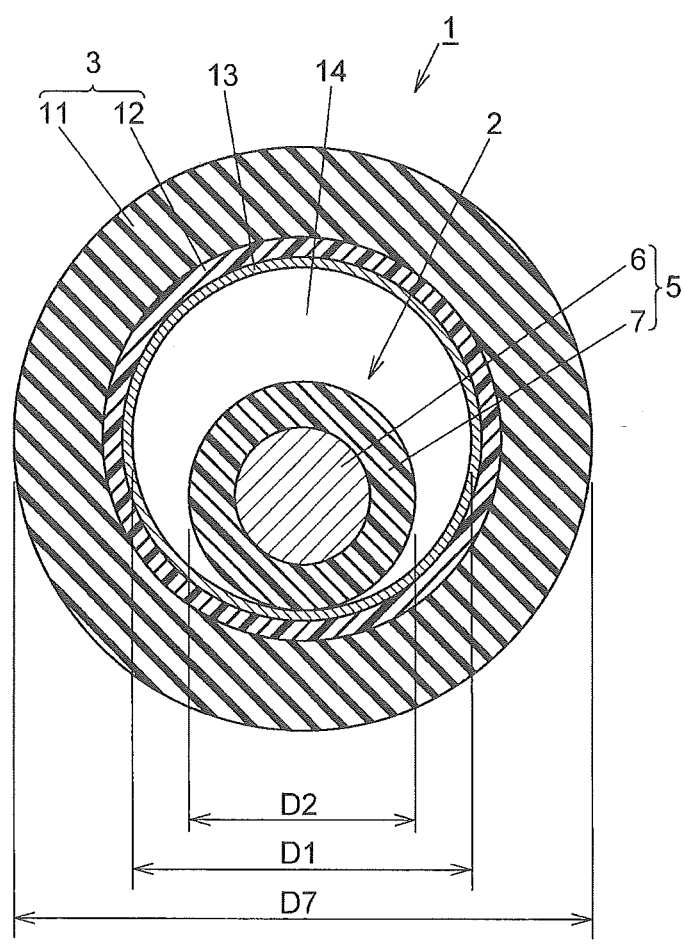
FIG. 2 is a cross sectional view showing a configuration example of an electric cable in the embodiment according to the invention.

First, a configuration of the electric cable 1 is described. FIG. 2 is a cross sectional view showing a configuration example of the electric cable 1 in the embodiment according to the invention. The electric cable 1 illustrated has moderate flexibility, and is configured to mainly include an electric wire section 2, a protecting section 3, which is provided around the electric wire section 2 as an outer layer to cover the electric wire section 2, and an intervening shield braid layer 13 between the electric wire section 2 and the protecting section 3. Note the, herein, a longitudinal direction of the electric cable 1 is termed "cable longitudinal direction", and a diameter direction of the electric cable 1 is termed "cable diametrical direction".

(Electric Wire Section)

The electric wire section 2 is configured as one electric wire 5. The electric wire 5 includes a conductor 6, and an insulator 7, which covers a circumference of the conductor 6.

(Conductor)

The conductor 6 is located around a central axis of the electric wire 5 as a core wire of the electric wire 5. The conductor 6 may be formed using, for example, a linear conductor made of tinned soft copper (as one example, conductor cross section (SQ)=3 mm$^2$). The conductor 6 may be configured as one linear conductor, or a stranded wire comprising a plurality of linear conductors stranded together. Also, the conductor 6 may be formed using a metal wire such as an annealed copper wire, silver plated annealed copper wire, tinned copper alloy wire, or the like.

(Insulator)

The insulator 7 is formed concentrically with the conductor 6 so as to cover an entire outer circumferential surface of the conductor 6. The insulator 7 is formed with a constant thickness dimension (e.g., a thickness of 0.7 mm). For example, the insulator 7 may be formed of cross-linked polyethylene (XLPE). Also, the insulator 7 may be formed of a resin material such as polyethylene, polyethylene foam, cross-linked polyethylene foam, polypropylene, fluoric resin, or the like.

(Protecting Section)

The protecting section 3 is configured to protect the electric wire section 2, and includes a cylindrical sheath 11, and a reinforcing braid layer 12, which covers an inner surface of the cylindrical sheath 11.

(Sheath)

The sheath 11 is configured to constitute an outer covering of the electric cable 1. The sheath 11 is formed in a circular cross section shape. This results in the entire protecting section 3 being formed in a circular cylindrical shape. The above described electric wire section 2 is then arranged (received) within the cylinder of the protecting section 3. The sheath 11 is located around an outermost side in the cable diametrical direction. This results in the outer circumferential surface of the sheath 11 constituting the outer circumferential surface of the electric cable 1. The sheath 11 is formed of an electrical insulating material. Specifically, the sheath 11 is formed with a thickness of, for example, the order of 0.5 mm using a rubber material such as ethylene propylene diene rubber or the like. The rubber material used in forming the sheath 11 preferably fulfills excellent heat resistance, weather resistance, and oil resistance properties. As one example, a brake hose rubber material may be used.

The brake hose rubber material may use an ethylene alpha-olefin polyene copolymer, which is formed by including a polyene, which is a norbornene compound terminally containing a vinyl group. Also, the rubber material may use a mixed rubber material including an ethylene alpha-olefin polyene copolymer, which is formed by including a polyene, which is a norbornene compound terminally containing a vinyl group, and a SiH group containing compound, which includes a plurality of SiH groups in one molecule. Note that as long as the mixed rubber material fulfills the function of sheath 11, the mixed rubber material may appropriately include compounding agents such as a reinforcing agent, a filler, a plasticizer, a softener, a processing aid, an activator, an antiscorching agent and an antiaging agent. Also, the mixed rubber material may be formed by blending a plurality of polymeric materials.

Also, the rubber material may use ethylene propylene diene rubber, styrene butadiene rubber, butyl rubber, nitrile rubber or chloroprene rubber. In this embodiment, it is preferable to use the pressureless vulcanizable mixed rubber material as the rubber material. Note that the constituent ethylene alpha-olefin polyene copolymer of the mixed rubber material is a ter-, or higher copolymer including ethylene, alpha olefin and polyene, and as one example, may use ethylene propylene diene rubber (EPDM).

The alpha olefin may use propylene, 1-butene, 4-methyl-1-pentene, 1-hexene, 1-heptene, 1-octene, or the like. Furthermore, the polyene typified by dienes may use dicyclopentadiene, 1,4-hexadiene, 3-methyl-1,4-hexadiene, 5-methyl-1,4-hexadiene, 7-methyl-1,6-octa-diene, 5-ethylidene-2-norbornene, 5-methylene-2-norbornene, 5-vinyl-2-norbornene, or the like.

The constituent SiH group containing compound of the mixed rubber material is used as a cross linker for the mixed rubber material. In this embodiment, it is preferred to use the SiH group containing compound which includes in one molecule two, or preferably three or more SiH groups for the purpose of enhancing the degree of cross-linkage. Note that the mixed rubber material may contain a catalyst, and a reaction inhibitor. The catalyst uses a catalyst to accelerate a hydrosilylation reaction between the ethylene alpha-olefin polyene copolymer and the SiH group containing compound. The catalyst may use, for example, a platinum based catalyst, a palladium based catalyst, a rhodium based catalyst, or the like.

Also, the reaction inhibitor is appropriately added to the mixed rubber material for the purpose of inhibiting the excessive hydrosilylation reaction. The reaction inhibitor may use, for example, a benzotriazole, a hydroperoxide, an ethynyl cyclohexanol, tetramethylethylene diamine, triallyl cyanurate, acrylonitrile, acrylic maleate, or the like.

(Reinforcing Braid Layer)

The reinforcing braid layer 12 is formed to cover the entire inner circumferential surface of the sheath 11. The reinforcing braid layer 12 is formed concentrically with the sheath 11 by adhering (bonding) to the inner circumferential surface of the sheath 11. The reinforcing braid layer 12 is formed by crossing and twisting, so-called braiding of a plurality of fibers or threads. The fibers or threads are formed with a diameter of 0.1 mm using a synthetic resin such as polyvinyl alcohol or the like. Also, it is preferred that the fibers or threads are formed of a material being excellent in fatigue resistance and abrasion resistance. The fibers or threads may be formed of, for example, at least one selected from, besides polyvinyl alcohol, polyethylene terephthalate or polyethylene-2,6-naphthalate. The fibers or threads to form the reinforcing braid layer 12 may preferably be formed by using polyvinyl alcohol. Note that, in the present embodiment, the fiber refers to a fine threadlike form. Also, the thread refers to a linearly continuous fiber form.

(Shield Braid Layer)

The shield braid layer 13 has an electrical shielding function and is formed to cover an entire inner surface of the reinforcing braid layer 12. As with the reinforcing braid layer 12, the shield braid layer 13 is formed concentrically with the sheath 11. The shield braid layer 13 may be formed using a copper foil thread with a copper foil provided around a core thereof made of a fiber or a thread. The shield braid layer 13 is formed by crossing and twisting, so-called braiding of a plurality of copper foil threads.

The core of the copper foil thread used in formation of the shield braid layer 13 may be configured as a fiber or a thread made of a polymeric resin material. Specifically, the copper foil thread may be configured using a 0.11 mm diameter core thread of polyethylene terephthalate (PET), for example. The core thread may be formed from one fiber or thread. Also, the core thread may be formed by braiding a plurality of fibers or threads together. The copper foil may be formed with a thickness of 12 µm, for example. And, the copper foil thread may be formed by helically wrapping a copper foil around a circumference of the core thread.

Also, the copper foil thread may be formed by applying a plating film to its surface. The application of the plating film to the surface of the copper foil thread allows for preventing oxidation of the surface of the copper foil. The plating film may be formed by tin plating, for example. Preventing the oxidation of the surface of the copper foil by the use of the plating film allows for suppressing an adverse effect such as an increase in electrical resistance of the shield braid layer 13.

<3. Technical Significance of Providing the Reinforcing Braid Layer>

In this embodiment, the reinforcing braid layer 12 is provided around the inner circumference of the sheath 11. There are two main technical significances of providing the reinforcing braid layer 12 in the electric cable 1. The first technical significance is to enhance a gripping force when the electric cable 1 is fixed by swaging of a cylindrical portion (to be described later) of the cable clamp 50. That is, the reinforcing braid layer 12 is provided around the inner circumference of the sheath 11 so that, when the cylindrical portion of the cable clamp 50 is swaged by being fitted around outside the electric cable 1, a finely uneven surface of the reinforcing braid layer 12 is acted on by a tightening force resulting from the swaging and bitten into the inner circumferential surface of the sheath 11. Accordingly, the swaged portion of the cylindrical portion has the sufficient gripping force, even if the tightening force for the sheath 11 resulting from the swaging of the cylindrical portion is not so great.

The second technical significance is to enhance a tensile strength of the electric cable 1. That is, the reinforcing braid layer 12 with the polyethylene terephthalate fibers or the like twisted together is provided around the inner circumference of the sheath 11 so that when for some reason the electric cable 1 is acted on by a tensile force in the cable longitudinal direction, an elongation of the entire cable 1 is reduced by the reinforcing braid layer 12. This mitigates the damage to the electric wire section 2 when the electric cable 1 is acted on by the tensile force. Accordingly, it is possible to enhance the tensile strength of the electric cable 1.

<4. Relationship Between the Electric Wire Section and the Protecting Section>

The electric cable 1 in the present embodiment is provided with a hollow portion 14 within the cylinder of the protecting section 3 with the electric wire section 2 arranged therein. The hollow portion 14 is configured to allow displacement of the electric wire section 2 in the cable diametrical direction, i.e., the direction at right angles to the cable longitudinal direction within the cylinder of the protecting section 3. This allows some degree of free movement of the electric wire section 2 arranged within the cylinder of the protecting section 3, in the direction at right angles to the cable longitudinal direction. Also, within the cylinder of the protecting section 3, the electric wire section 2 is displaceable (slidable) in the cable longitudinal direction as well.

In this embodiment, in order to provide the hollow portion 14 within the cylinder of the protecting section 3, an inner diameter D1 of the protecting section 3 is configured to be larger than an outer diameter D2 of the constituent electric wire 5 of the electric wire section 2. Also, in the present embodiment, an inner circumferential layer of the protecting section 3 is formed to have a double layer structure in which the reinforcing braid layer 12 and the shield braid layer 13 are overlapped together. For this reason, the inner diameter D1 of the protecting section 3 is configured to be a dimension allowing for respective thickness dimensions of the reinforcing braid layer 12 and the shield braid layer 13.

Figure 3:
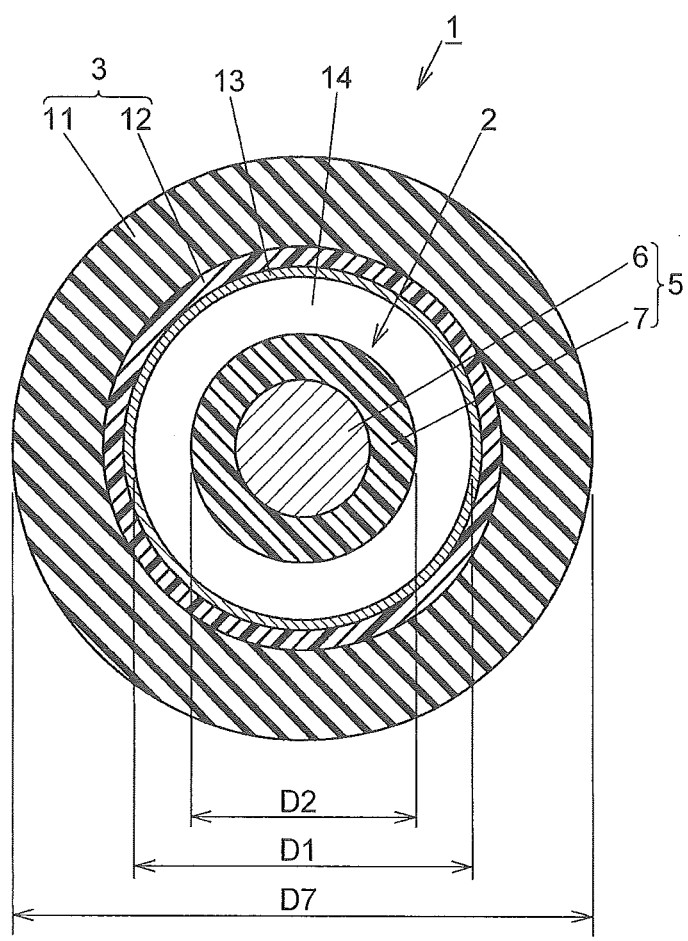
FIG. 3 is a cross sectional view showing an electric wire section when concentrically arranged in a cylinder of a protecting section.

From the above described dimension relationship, for example, when as shown in FIG. 2, the electric wire 5 is displaced downward in such a manner that a lower portion of the insulator 7 of the electric wire 5 comes into contact with the shield braid layer 13, the crescent hollow portion 14 in cross section shape is formed within the cylinder of the protecting section 3. The crescent hollow portion 14 is likewise formed when the electric wire 5 is displaced and arranged in an upward, downward, leftward or rightward direction. In contrast, when as shown in FIG. 3, the electric wire 5 of the electric wire section 2 is arranged on a central axis of the protecting section 3 within the cylinder of the protecting section 3, i.e. when the protecting section 3 and the electric wire 5 are arranged concentrically, the ring shaped hollow portion 14 in cross section shape is formed within the cylinder of the protecting section 3 to surround the electric wire section 2.

<5. Cable Clamp Configuration>

Figure 4:
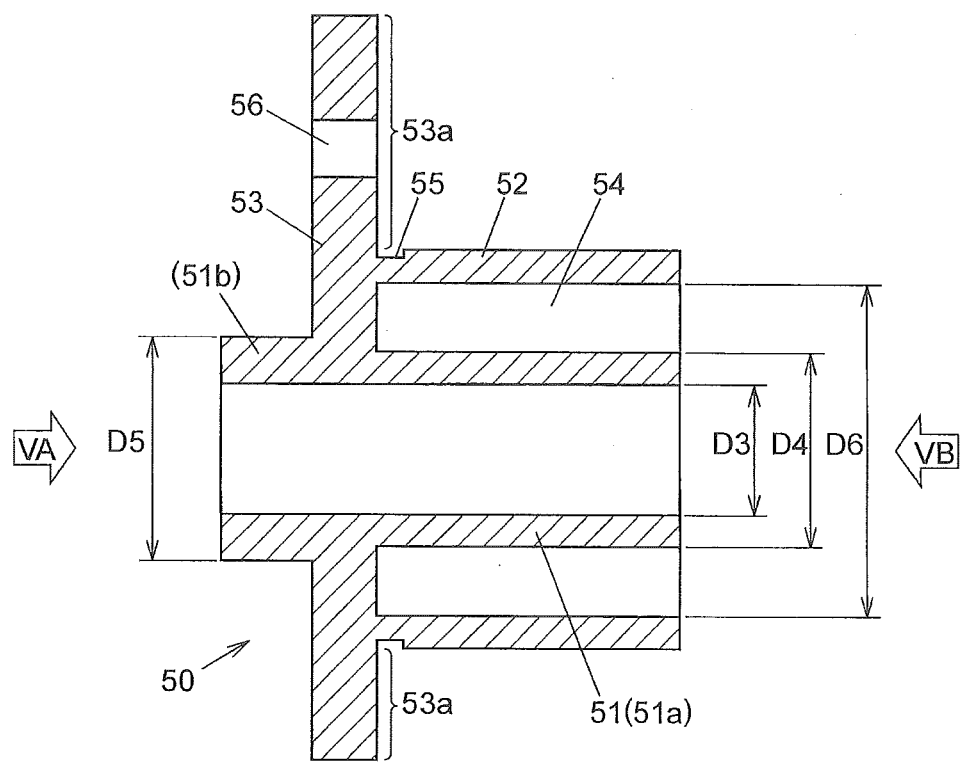
FIG. 4 is a cross sectional view showing a configuration example of a cable clamp in the embodiment according to the invention.

Next, a configuration of the cable clamp 50 is described. FIG. 4 is a cross sectional view showing a configuration example of the cable clamp 50 in the embodiment according to the invention. Also, FIG. 5A is a view on arrow A in FIG. 4, and FIG. 5B is a view on arrow B in FIG. 4. The cable clamp 50 as illustrated is configured to fix the above described electric cable 1, and is suitable particularly for use when fixing a terminal of the electric cable 1. The cable clamp 50 is formed by use of a metal being non-magnetic and high in electrical conductivity, such as aluminum or an aluminum alloy (duralumin or the like). The cable clamp 50 mainly integrally includes a first cylindrical portion 51, a second cylindrical portion 52 and an interlocking portion 53 with a flange 53a.

(First Cylindrical Portion)

The first cylindrical portion 51 is formed in a circular cylindrical shape. The cylindrical portion 51 is formed for the electric wire section 2 (the electric wire 5) of the above described electric cable 1 to be inserted therein. Specifically, an inner diameter D3 of the cylindrical portion 51 is configured to be the same as or slightly larger than an outer diameter D2 of the electric wire section 2. This allows the electric wire section 2 to be inserted into the cylindrical portion 51. That is, the cylindrical portion 51 is formed with a hole for the electric wire section 2 to be inserted therein.

Also, the cylindrical portion 51 is formed to project from the interlocking portion 53 in one thickness direction of the interlocking portion 53 and in the other thickness direction thereof. Herein, the projecting first cylindrical portion 51 in the one thickness direction of the interlocking portion 53 is referred to as a "first cylindrical portion 51a" while the projecting first cylindrical portion 51 in the other thickness direction of the interlocking portion 53 is referred to as a "third cylindrical portion 51b."

The first cylindrical portion 51a and the third cylindrical portion 51b have uniformly the same inner diameter dimension (D3) in the central axis direction of the first cylindrical portion 51. An outer diameter D4 of the first cylindrical portion 51a is smaller than an outer diameter D5 of the third cylindrical portion 51b, and a thickness dimension of the first cylindrical portion 51a is correspondingly smaller than a thickness dimension of the third cylindrical portion 51b. It should be noted, however, that the thickness dimension relationship between the first cylindrical portion 51a and the third cylindrical portion 51b may be the converse thickness dimension relationship, or the equal thickness dimension relationship.

(Second Cylindrical Portion)

The second cylindrical portion 52 is formed in a circular cylindrical shape concentrically with the above described first cylindrical portion 51. As with the first cylindrical portion 51a, the second cylindrical portion 52 is formed to project from the interlocking portion 53 in one thickness direction of the interlocking portion 53. A projection dimension of second cylindrical portion 52 is configured to be the same as a projection dimension of the first cylindrical portion 51a. The second cylindrical portion 52 is formed around outside the first cylindrical portion Ma to surround the first cylindrical portion 51a. This results in the cable clamp 50 having the double cylindrical structure comprising the first cylindrical portion 51a and the second cylindrical portion 52.

In the above described double cylindrical structure, a receiving portion 54 to receive the protecting section 3 of the electric cable 1 is formed between the first cylindrical portion 51a and the second cylindrical portion 52. Specifically, the outer diameter D4 of the first cylindrical portion 51a is configured to be slightly smaller than the inner diameter D1 of the protecting section 3, and the inner diameter D6 of the second cylindrical portion 52 is configured to be slightly larger than the outer diameter D7 (see FIGS. 2 and 3) of the protecting section 3. For this reason, a space dimension of the receiving portion 54 in the diametrical direction of the first cylindrical portion 51 and the second cylindrical portion 52 is smaller than a thickness dimension of the protecting section 3.

The second cylindrical portion 52 is formed with a deformation relieving portion 55 therearound. The deformation relieving portion 55 is a portion to relieve the deformation of the flange 53a due to the swaging, when the second cylindrical portion 52 is externally swaged with a swaging tool. The deformation relieving portion 55 is formed around a flange 53a side base end of the second cylindrical portion 52 relative to a portion to be swaged. Also, the deformation relieving portion 55 is formed as a thin portion which is a portion partially reduced in thickness dimension of the second cylindrical portion 52 by forming a recessed groove in a circumferential direction on an outer circumferential surface of the second cylindrical portion 52. In this case, the recessed groove forming the deformation relieving portion 55 may be formed around the entire circumference of the second cylindrical portion 52, or to be divided in the circumferential direction of the second cylindrical portion 52 at a predetermined angle pitch into multiple deformation relieving portions.

(Interlocking Portion)

The interlocking portion 53 interlocks the first cylindrical portion 51 and the second cylindrical portion 52 together. The interlocking portion 53 is formed in a plate shape. A thickness direction of the interlocking portion 53 is the same as the central axis direction of the first cylindrical portion 51. The interlocking portion 53 is formed in an elongated circular shape when viewed in the central axis direction of the first cylindrical portion 51. Of the interlocking portion 53, the flange 53a, which is jutted outward relative to the second cylindrical portion 52, is formed with a connecting hole 56 therein. The connecting hole 56 is configured to fix the cable clamp 50 to an electronic device chassis (not shown) which is a member to be fixed. The connecting hole 56 is formed to penetrate the flange 53a outward relative to the second cylindrical portion 52. The electronic device is one of electronic devices to be electrically connected together by use of the electric cable 1. When the electric cable 1 is fixed to the electronic device chassis by use of the cable clamp 50, the above described third cylindrical portion 51b is fitted in an engaging hole which is provided in the electronic device chassis.

<6. Harness Configuration>

Next, a configuration of a harness 100 is described. By combining together the above configured electric cable 1 and the above configured cable clamp 50, the harness 100 is provided as the electric cable 1 with the clamp 50. Specifically, the electric cable 1 and the cable clamp 50 are assembled together as follows. That is, as shown in FIG. 1, the electric wire section 2 (the electric wire 5) of the electric cable 1 is inserted into the hole of the cylindrical portion 51 of the cable clamp 50. At this point, the electric wire section 2 is inserted from the first cylindrical portion 51a side into the cylindrical portion 51 of the cable clamp 50 and drawn from the cylindrical portion 51 to the third cylindrical portion 51b side. Lengths of the electric wire section 2 and the protecting section 3 in the electric cable 1 are pre-adjusted so that the electric wire section 2 is drawn from the third cylindrical portion 51b by a predetermined dimension.

It is desirable that with the electric wire section 2 (the electric wire 5) inserted in the cylindrical portion 51 in this manner, a suitable space is ensured therebetween by configuring the inner diameter D3 of the cylindrical portion 51 to be slightly larger than the outer diameter D2 of the electric wire section 2. There are two main reasons therefor: One reason is because the insertion of the electric wire section 2 into the cylindrical portion 51 is facilitated. The other reason is because the interposition of the aforementioned space allows the electric wire section 2 to be freely movable (slidable) in the central axis direction of the cylindrical portion 51 to thereby mitigate the load acting on the electric wire section 2 when the electric cable 1 is bent.

On the other hand, the protecting section 3 of the electric cable 1 is received in the receiving portion 54 of the cable clamp 50. At this point, prior to the receiving, at an end of the protecting section 3, the shield braid layer 13 is folded back to outside the protecting section 3 in such a manner that respective ends of the sheath 11 and the reinforcing braid layer 12 are covered with the shield braid layer 13. Then, the protecting section 3 is inserted and received in the receiving portion 54. At this point, the protecting section 3 is inserted until the end of the protecting section 3 abuts on the base of the receiving portion 54 (i.e. one surface of the interlocking portion 53). This results in the shield braid layer 13 within the receiving portion 54 being in contact with an outer circumferential surface of the first cylindrical portion 51a, an inner circumferential surface of the second cylindrical portion 52 and the one surface of the interlocking portion 53.

Then, the second cylindrical portion 52 of the cable clamp 50 is externally swaged with a swaging tool, thereby resulting in the electric cable 1 and the cable clamp 50 being combined (integrated) together. For the second cylindrical portion 52, a swaging location therearound is predetermined so that the swaging tool is brought into contact with the swaging location around the second cylindrical portion 52 to externally apply a swaging load to the second cylindrical portion 52. This results in an outer circumferential surface of the second cylindrical portion 52 being acted on by the swaging load applied by the swaging tool, deformed and depressed inward. At this point, the protecting section 3 received in the receiving portion 54 is sandwiched between the first cylindrical portion 51a and the second cylindrical portion 52. This results in the protecting section 3 being gripped by the swaged portion (i.e. the deformed and depressed portion) 57 of the second cylindrical portion 52 with a gripping force to fix the electric cable 1 to the cable clamp 50.

Also, when the swaging load is applied to the second cylindrical portion 52, the stress due to the swaging load is transmitted through the second cylindrical portion 52 to the flange 53a. On this occasion, forming the thin deformation relieving portion 55 around the second cylindrical portion 52 beforehand results in mechanical strength (rigidity, etc.) lowering at that thin deformation relieving portion 55. For this reason, the stress transmitted from the second cylindrical portion 52 to the flange 53a becomes small, as compared with when no deformation relieving portion 55 is formed. Therefore, the deformation (sloping, etc.) of the flange 53a resulting from the stress transmission is suppressed.

As described above, the assembling together of the electric cable 1 and the cable clamp 50 results in the harness 100 with those parts 1 and 50 integrally combined together.

<7. Harness Attachment>

When the harness 100 is attached to the aforementioned electronic device chassis, the third cylindrical portion 51b is inserted and fitted into the engaging hole provided in the electronic device chassis, and one surface of the interlocking portion 53 is brought into contact with a side surface of the electronic device chassis. Then, a bolt is passed through the connecting hole 56 in the flange 53a of the interlocking portion 53, and a male threaded portion of the bolt is screwed and tightened into a female threaded portion which is provided on the electronic device chassis. This results in the harness 100 being attached to the electronic device chassis.

Incidentally, when the harness 100 in the present embodiment is mounted on an automobile, electronic devices (a power supply, an inverter, a controller, etc.), which are arranged on a vehicle body, and electronic devices (an in wheel motor, an electric brake, sensors of each type, etc.), which are arranged in wheel portions under a spring, are electrically connected together with the electric cable 1, and the cable clamp 50 is attached to the chassis of the electronic devices of each type.

<8. Functions and Advantageous Effects of the Embodiment>

The embodiment according to the invention adopts the configuration with the protecting section 3 of the electric cable 1 gripped by providing the first cylindrical portion 51 and the second cylindrical portion 52 in the cable clamp 50 to form the receiving portion 54 between the first cylindrical portion 51 and the second cylindrical portion 52, inserting the protecting section 3 of the electric cable 1 into the receiving portion 54, and swaging the second cylindrical portion 52. With this adopted configuration, when the second cylindrical portion 52 is swaged, the tightening force (swaging load) resulting from the swaging acts on the first cylindrical portion 51a with the protecting section 3 between the first cylindrical portion 51a and the second cylindrical portion 52. For this reason, the tightening force resulting from the swaging is not likely to be transmitted to the electric wire section 2. Accordingly, it is possible to greatly reduce the load acting on the electric wire section 2, when swaging the second cylindrical portion 52.

Also, when the protecting section 3 is received into the receiving portion 54 between the first cylindrical portion 51 and the second cylindrical portion 52 and the second cylindrical portion 52 is swaged, the protecting section 3 is sandwiched between those cylindrical portions 51 and 52 with the tightening force resulting from the swaging. For this reason, the tightening force resulting from the swaging becomes a gripping force to sandwich the protecting section 3 and concentrates on the protecting section 3. Accordingly, the swaged portion 57 of the second cylindrical portion 52 has the sufficient gripping force, even if the second cylindrical portion 52 is not so greatly deformed when swaged. Particularly when, as the configuration of the protecting section 3, the reinforcing braid layer 12 is provided around the inner circumference of the sheath 11, the reinforcing braid layer 12, when acted on by the tightening force resulting from the swaging, is strongly pressed against the sheath 11 due to a reaction force from the cylindrical portion 51. This allows the finely uneven surface of the reinforcing braid layer 12 to be bitten into the inner circumferential surface of the sheath 11. Accordingly, it is possible to enhance the electric cable 1 gripping force of the cable clamp 50.

Also, swaging the second cylindrical portion 52 allows the protecting section 3 to be gripped with no space between the first cylindrical portion 51a and the second cylindrical portion 52. This allows for ensuring waterproofness of the cable clamp 50 portion with the protecting section 3 inserted therein even with no separate packing used in the portion or with no waterproofing resin coated therearound. This allows for low cost production of the harness 100. It should be noted, however, that, in implementing this invention, a packing may be used or a waterproofing resin may be coated, if desired. Also, when the third cylindrical portion 51b is fitted into the engaging hole provided in the electronic device chassis, the third cylindrical portion 51b may be provided with a packing around its outer circumferential surface to ensure its waterproofness.

Also, if the electric cable 1 fixed by using the cable clamp 50 is bent for some reason, the electric wire section 2 and the protecting section 3 of the electric cable 1 are held separate from each other in the cable diametrical direction in the vicinity of the cable clamp 50. This allows for suppressing the strain caused in the electric wire section 2 (the electric wire 5) due to the bending of the electric cable 1. Accordingly, it is possible to enhance the bending resistance of the electric cable 1. This prominent effect is achieved, particularly when the harness 100 is used in application to automobiles in environments where cables undergo repeated bendings.

Also, the shield braid layer 13 is provided around the inner circumference of the protecting section 3, and with the shield braid layer 13 folded back, the protecting section 3 is received in the receiving portion 54, in such a manner that the shield braid layer 13 is brought into contact with both the first cylindrical portion 51a and the second cylindrical portion 52. This allows the shield braid layer 13 and ground to be stably electrically connected through the cable clamp 50, for example. Also, the protecting section 3 is received in the receiving portion 54 with the shield braid layer 13 pre-folded back at the end of the protecting section 3. This allows for, when the protecting section 3 is received into the receiving portion 54, suppressing turning up, etc. of the shield braid layer 13. In addition, the insertion of the shield braid layer 13 into the receiving portion 54 is facilitated.

<9. Modifications>

The technical scope of this invention is not limited to the above described embodiment, but includes various alterations and improvements that derive the specific advantageous effects from the requirements for the configuration of the invention and combinations thereof.

Figure 6:
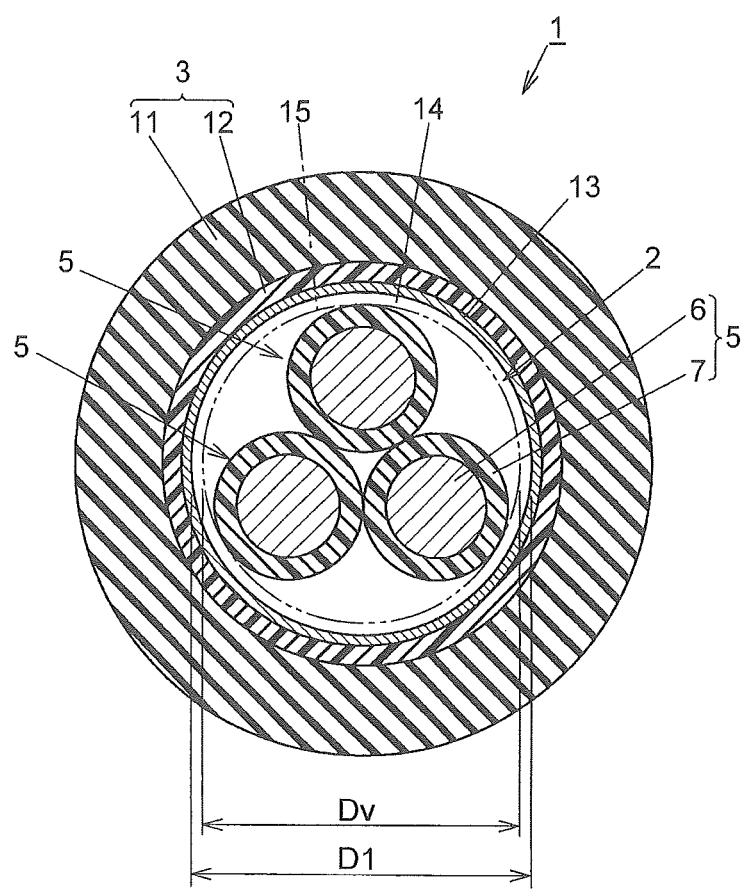
FIG. 6 is a cross sectional view showing a specific example of the electric wire section when configured as multiple electric wires.

For example, although in the above described embodiment, the electric wire section 2 is configured as one electric wire 5, this invention is not limited thereto, but the electric wire section 2 may be configured as multiple electric wires. A specific example thereof is shown in FIG. 6: The electric wire section 2 may be configured as three electric wires 5. In that case, when the three electric wires 5 are in close contact with each other, a virtual circle (circumscribed circle) 15, into which the three electric wires 5 fit, is assumed. The inner diameter D1 of the protecting section 3 may then be configured to be larger than the diameter Dv of the virtual circle 15, so that the hollow portion 14 is provided within the cylinder of the protecting section 3. Also, the three electric wires 5 may be straight wires each extending in the cable longitudinal direction, or may be wires stranded together.

Figure 7:
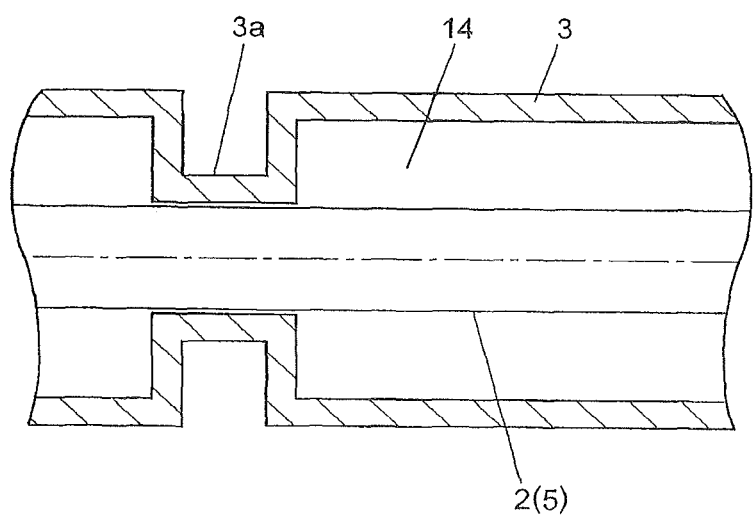
FIG. 7 is a schematic cross sectional view showing the protecting section partially formed with a diametrically reduced portion therearound.

Also, when the hollow portion 14 is provided within the cylinder of the protecting section 3, the hollow portion 14 may be provided fully and uniformly in the cable longitudinal direction, or only partially (i.e. in part fixed to the cable clamp 50) in the cable longitudinal direction. In the latter case, as shown in FIG. 7, the protecting section 3 may be configured by forming a diametrically reduced portion 3a therearound, partially in the cable longitudinal direction (i.e. in the horizontal direction in FIG. 7), so that the electric wire section 2 (the electric wire 5) is positioned on the central axis (indicated by alternate long and short dash line in FIG. 7) of the protecting section 3 by the diametrically reduced portion 3a. Adopting this configuration allows for, when the electric cable 1 is attached to the cable clamp 50, facilitating alignment therebetween in the cable diametrical direction.

Also, although in the above described embodiment, the shield braid layer 13 is provided around the inner circumference of the protecting section 3, this invention is not limited thereto, but the shield braid layer 13 may be provided around an outer circumference of the electric wire section 2, in place of the inner circumference of the protecting section 3.

Also, when the swaged portion 57 is formed around the second cylindrical portion 52, a plurality of the swaged portions 57 may be formed by swaging the plurality of different areas in the central axis direction of the second cylindrical portion 52.

Also, respective projecting end faces of the first cylindrical portion 51a and the second cylindrical portion 52 projecting in one thickness direction of the interlocking portion 53 may be formed into, for example, a chamfered shape or a rounded shape, so as to mitigate the mechanical damage to the protecting section 3 resulting from bending of the electric cable 1.

Also, the cable clamp according to this invention may be applied to not only the case of fixing the terminal of the electric cable 1, but also the case of fixing a middle portion of the electric cable 1, in which case the double cylindrical structures comprising the first cylindrical portion 51a and the second cylindrical portion 52 are provided on both sides, respectively, of the interlocking portion 53.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A cable clamp, which is configured to fix an electric cable including an electric wire section and an outer layer section covering the electric wire section to a fixed member, the cable clamp comprising:

a first cylindrical portion for the electric wire section to be inserted therein; and a second cylindrical portion formed around outside the first cylindrical portion to surround the first cylindrical portion, the second cylindrical portion including a receiving portion formed between it and the first cylindrical portion to receive the outer layer section, wherein the second cylindrical portion is swaged with the electric wire section inserted in the first cylindrical portion and with the outer layer section received in the receiving portion, so that the outer layer section is gripped by the first cylindrical portion and the second cylindrical portion.

2. The cable clamp according to claim 1, further comprising:

an interlocking portion, which interlocks the first cylindrical portion and the second cylindrical portion together, and which is configured to be connected to the fixed member to thereby fix the cable to the fixed member.

3. The cable clamp according to claim 2, wherein the interlocking portion includes a flange formed to be jutted outward relative to the first cylindrical portion and the second cylindrical portion, the flange being formed with a connecting hole therein for a bolt to connect the interlocking portion to the fixed member.

4. The cable clamp according to claim 3, wherein the second cylindrical portion includes a deformation relieving portion around a flange side thereof relative to a swaged portion thereof, to relieve deformation of the flange due to the swaging.

5. The cable clamp according to claim 4, wherein the deformation relieving portion is being formed as a thin portion partially reduced in thickness dimension of the second cylindrical portion.

6. A harness, comprising:

an electric cable including an electric wire section and an outer layer section covering the electric wire section; and a cable clamp to fix the electric cable to a fixed member, the cable clamp comprising a first cylindrical portion for the electric wire section to be inserted therein, and a second cylindrical portion formed around outside the first cylindrical portion to surround the first cylindrical portion, the second cylindrical portion including a receiving portion formed between it and the first cylindrical portion to receive the outer layer section, the electric cable and the cable clamp being combined together by swaging of the second cylindrical portion with the electric wire section inserted in the first cylindrical portion and with the outer layer section received in the receiving portion.

7. The harness according to claim 6, wherein the electric cable includes a shield layer, the shield layer being received in the receiving portion, and folded back in the receiving portion to be in contact with both an outer circumferential surface of the first cylindrical portion and an inner circumferential surface of the second cylindrical portion.

* * * * *